(12) United States Patent
Song (10) Patent No.: US 6,621,821 B1
(45) Date of Patent: Sep. 16, 2003

(54) AAL2 PROCESSING DEVICE AND METHOD FOR ATM NETWORK

(75) Inventor: Doug-Young Song, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/439,750

(22) Filed: Nov. 15, 1999

(30) Foreign Application Priority Data

Nov. 13, 1998 (KR) ........................................ 1998-48578

(51) Int. Cl.⁷ ............................................. H04L 12/56
(52) U.S. Cl. ................................... 370/395.6; 370/409
(58) Field of Search ........................ 370/395.6, 395.64, 370/395.7, 409

(56) References Cited

U.S. PATENT DOCUMENTS

| | | | |
|---|---|---|---|
| 5,822,321 A | * 10/1998 | Petersen et al. | 370/474 |
| 6,031,838 A | * 2/2000 | Okabe et al. | 370/395.6 |
| 6,075,798 A | * 6/2000 | Lyons et al. | 370/474 |
| 6,229,821 B1 | * 5/2001 | Bharucha et al. | 370/471 |
| 6,434,151 B1 | * 8/2002 | Caves et al. | 370/395.2 |
| 6,449,275 B1 | * 9/2002 | Andersson et al. | 370/395.31 |
| 6,449,276 B1 | * 9/2002 | Subbiah et al. | 370/395.6 |
| 6,483,810 B1 | * 11/2002 | Ono et al. | 370/244 |
| 6,483,838 B1 | * 11/2002 | Ostman et al. | 370/395.31 |

FOREIGN PATENT DOCUMENTS

JP    11-346217    12/1999

OTHER PUBLICATIONS

Subbiah. ATM AAL2 for low bit rate speech and data: issues and challenges. ATM workshop Proceedings, 1998, IEEE, pp. 225–233.*

* cited by examiner

Primary Examiner—Hassan Kizou
Assistant Examiner—Dmitry Levitan
(74) Attorney, Agent, or Firm—Dilworth & Barrese, LLP (57) ABSTRACT

There is provided an AAL2 processing device comprising an AAL2 synchronizer for receiving an AAL2 cell in which at least one AAL2 packet is multiplexed, and detecting a start point of each packet to synchronize the packet; an AAL2 switch for switching the synchronized packet according to routing information provided during call setup; and an AAL2 formatter for multiplexing the switched packet according to ATM connections, and generating an output AAL2 cell having the same format as the input AAL2 cell. Further, the AAL2 processing device comprises a CID changer interconnected between the AAL2 synchronizer and the AAL2 switch, for determining whether there are packets to be switched to the same ATM connection at the same time out of the packets to be switched by the AAL2 switch by using the cell routing information, and changing, when there are such packets, the CIDs of the packets so that the CIDs of the packets are not identical to each other.

10 Claims, 11 Drawing Sheets

| VCIi | CIDi | VCIo | CIDo | PTi | PTo |
|---|---|---|---|---|---|
| 41 | ② | 83 | ③ | 0 | 1 |
| 42 | 7 | 84 | 7 | 1 | 2 |
| 43 | 2 | 83 | 2 | 2 | 3 |
| 44 | 5 | 81 | 5 | 3 | 0 |

FIG.5A

| VCIi | CIDi | VCIo | CIDo | PTi | PTo |
|---|---|---|---|---|---|
| 41 | 4 | 81 | 4 | 0 | 0 |
| 42 | ⑨ | 84 | ① | 1 | 3 |
| 43 | 6 | 82 | 6 | 2 | 1 |
| 44 | 9 | 84 | 9 | 3 | 2 |

AAL2 PROCESSING DEVICE AND METHOD FOR ATM NETWORK

PRIORITY

This application claims priority to an application entitled "AAL2 Processing Device and Method for ATM Network" filed in the Korean Industrial Property Office on Nov. 13, 1998 and assigned Ser. No. 98-48578.

BACKGROUND OF THE INVENTION

1. Field of the Invention

The present invention relates generally to an ATM (Asynchronous Transfer Mode) network, and in particular, to an AAL2 (ATM Adaptation Layer 2) processing device and method.

2. Description of the Related Art

Figure 1:
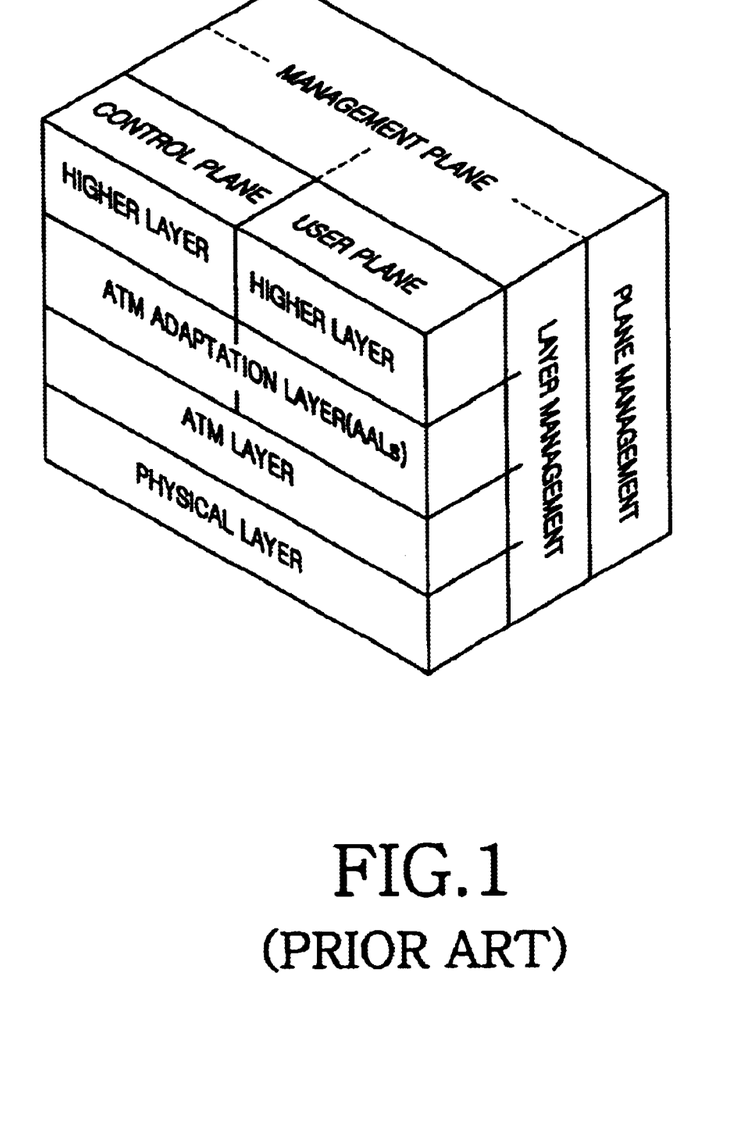
FIG. 1 is a diagram illustrating a reference model of a B-ISDN protocol.

A reference model of a B-ISDN (Broadband Integrated Services Digital Network) protocol, as shown in FIG. 1, is comprised of a vertical layer structure (protocol stack) including a physical layer, an ATM layer, ATM adaptation layers (AALs) and higher layers; and a horizontal plane structure including a user plane, a control plane and a management plane.

The AAL layer, which is interposed between the ATM layer and the higher layers, segments data information from the higher layers by the proper length for the cell structure. There are four different AAL protocols: AAL1, AAL2, AAL3/4 and AAL5. As is well known in the art, the AALs have a shorter and simple connection setup time during software processing, as compared with the ATM layer. Therefore, the ML layers in-between the ATM layer and the higher layers are widely used. Active research has been made on AAL1, AAL3/4 and AAL5, establishing the standard of a PDU (Protocol Data Unit) format in the respective layers. More recent research has been carried out on AAL2. As a result, an AAL2 CPS-PDU (AAL2 Common Part convergence Sublayer-PDU) format was established as a standard in ITU-T Recommendation I.362.2(D) in October, 1997. However, research on a method for controlling and managing the AAL2 CPS-PDU format is currently being carried out and will be completed by 2000.

AAL2 enables effective use of limited bandwidth by using multiplexing, which is also used by AAL1 and AAL3/4, and is fundamentally different from AAL5, which does not use the multiplexing concept. AAL1 is for carrying a circuit-based frame (for example, a T1 or E1 frame), not for multiplexing channels. In addition, unlike the circuit network-based AAL1, AAL2 is based on the ATM network. Further, unlike AAL3/4, which is only good for data service, AAL2 can service on average 3 or 4 additional subscribers on the basis of a single virtual circuit (VC) i.e., on the basis of one line, so that it is possible to more easily transmit real-time information having a short length. In general, a great deal of cells are transmitted through a single VC, and in a single cell, there can be one or more AAL2 packets. AAL3/4 is not good for carrying voice traffic because of transmission efficiency issues.

The AAL2 CPS-PDU format can be useful when transmitting multiple channels by multiplexing the channels into one ATM connection. In the ATM network, when transmitting real-time data (e.g., voice) having a short length, a transmission delay problem may occur due to loss of bandwidth or failure to maintain the real-time properties of the voice data. This problem can be solved by multiplexing the multiple channels into one ATM connection. In other words, by using the current AAL2 CPS-PDU format, it is possible to prevent a loss of the bandwidth or transmission delay when transmitting real-time information having a short length. As stated above, however, currently, there is no proposed method for controlling and managing the AAL2 CPS-PDU format.

SUMMARY OF THE INVENTION

It is, therefore, an object of the present invention to provide a device for preventing loss of bandwidth or transmission delay when transmitting real-time data having a short length in an ATM network.

It is another object of the present invention to provide a device for controlling and managing the AAL2 CPS-PDU format in an ATM network.

To achieve the above objects, there is provided an AAL2 processing device comprising an AAL2 synchronizer for receiving an AAL2 cell in which at least one AAL2 packet is multiplexed, and detecting a start point of each packet to synchronize the packet; an AAL2 switch for switching the synchronized packet according to routing information provided during call setup; and an AAL2 formatter for multiplexing the switched packet according to ATM connections, and generating an output AAL2 cell having the same format as the input AAL2 cell. Further, the AAL2 processing device comprises a CID (Channel Identification) changer interconnected between the AAL2 synchronizer and the AAL2 switch, for determining whether there are packets to be switched to the identical ATM connection at the same time out of the packets to be switched by the AAL2 switch by using the cell routing information, and changing, when there are such packets, the CIDs of the packets so that the CIDs of the packets are not identical to each other.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The term "ATM cell" as used herein refers to a general ATM cell, i.e., the 53-byte standard ATM cell, and the term "AAL2 cell" refers to an AAL2 CPS-PDU defined by ITU-T Recommendation I.362.2(D). Further, the term "AAL2 packet" refers to an AAL2 CPS-packet defined by ITU-T Recommendation I.362.2(D). One or more AAL2 packets fit into the AAL2 cell. Sometimes, the AAL2 packet is referred to as a mini-cell or an AAL2 channel.

Figure 2:
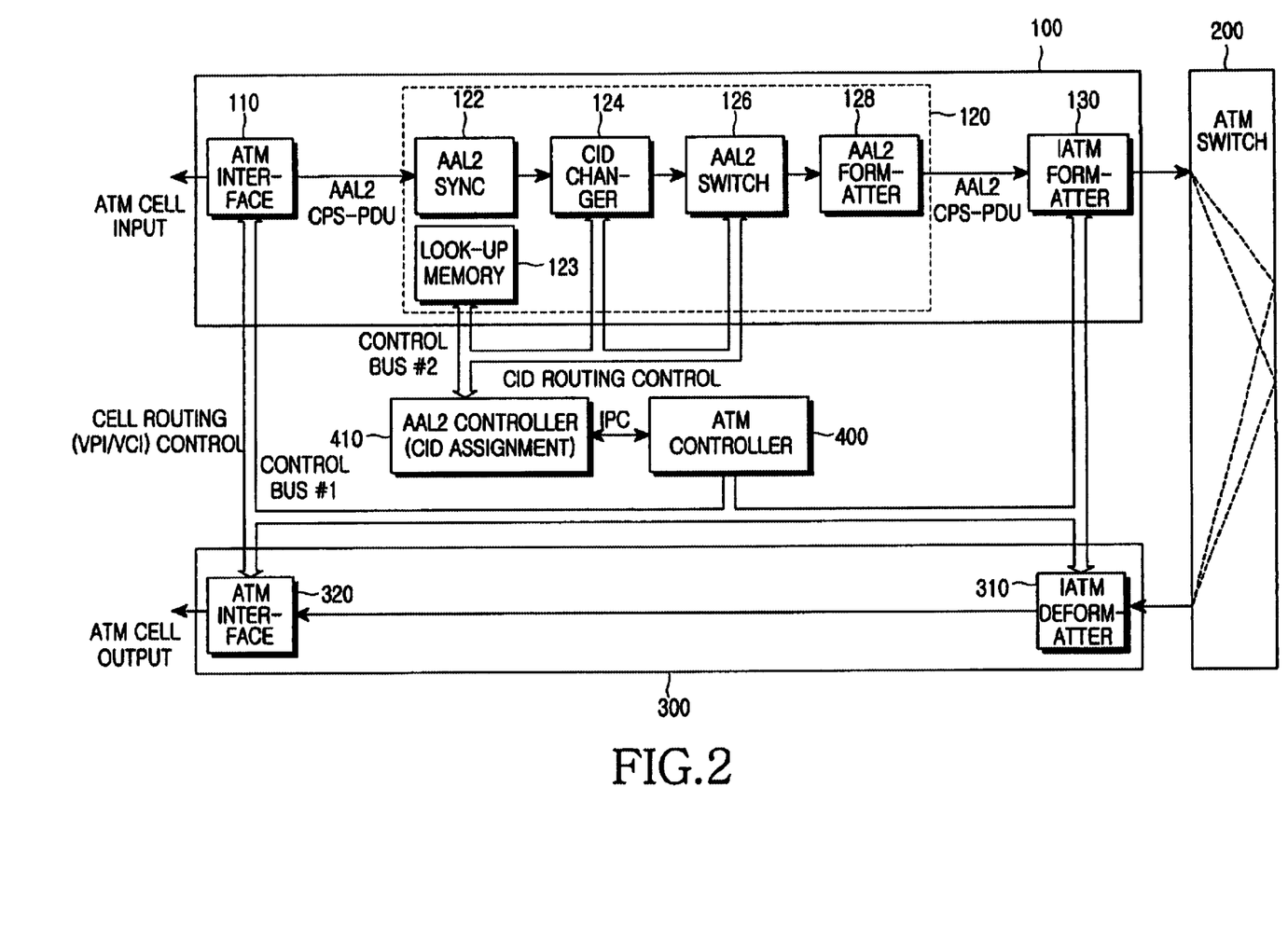
FIG. 2 is a block diagram illustrating an ATM system having an AAL2 processing function according to an embodiment of the present invention.

FIG. 2 shows an ATM system having an AAL2 processing function according to an embodiment of the present invention.

Referring to FIG. 2, the ATM system includes a receiver 100, an ATM switch 200, a transmitter 300, an ATM controller 400 and an AAL2 controller 410. The receiver 100 and the transmitter 300 include ATM interfaces 110 and 320, respectively. Further, the receiver 100 and the transmitter 300 include an internal ATM (IATM) formatter 130 and an IATM deformatter 310, respectively. Such a construction is well known in the art. However, in the ATM system according to the present invention, the receiver 100 further includes an AAL2 interface 120. The AAL2 interface 120, which is interconnected between the ATM interface 110 and the IATM formatter 130, includes an AAL2 synchronizer 122, a look-up memory 123, a CID (Channel Identification) changer 124, an AAL2 switch 126 and an AAL2 formatter 128.

Figure 3:
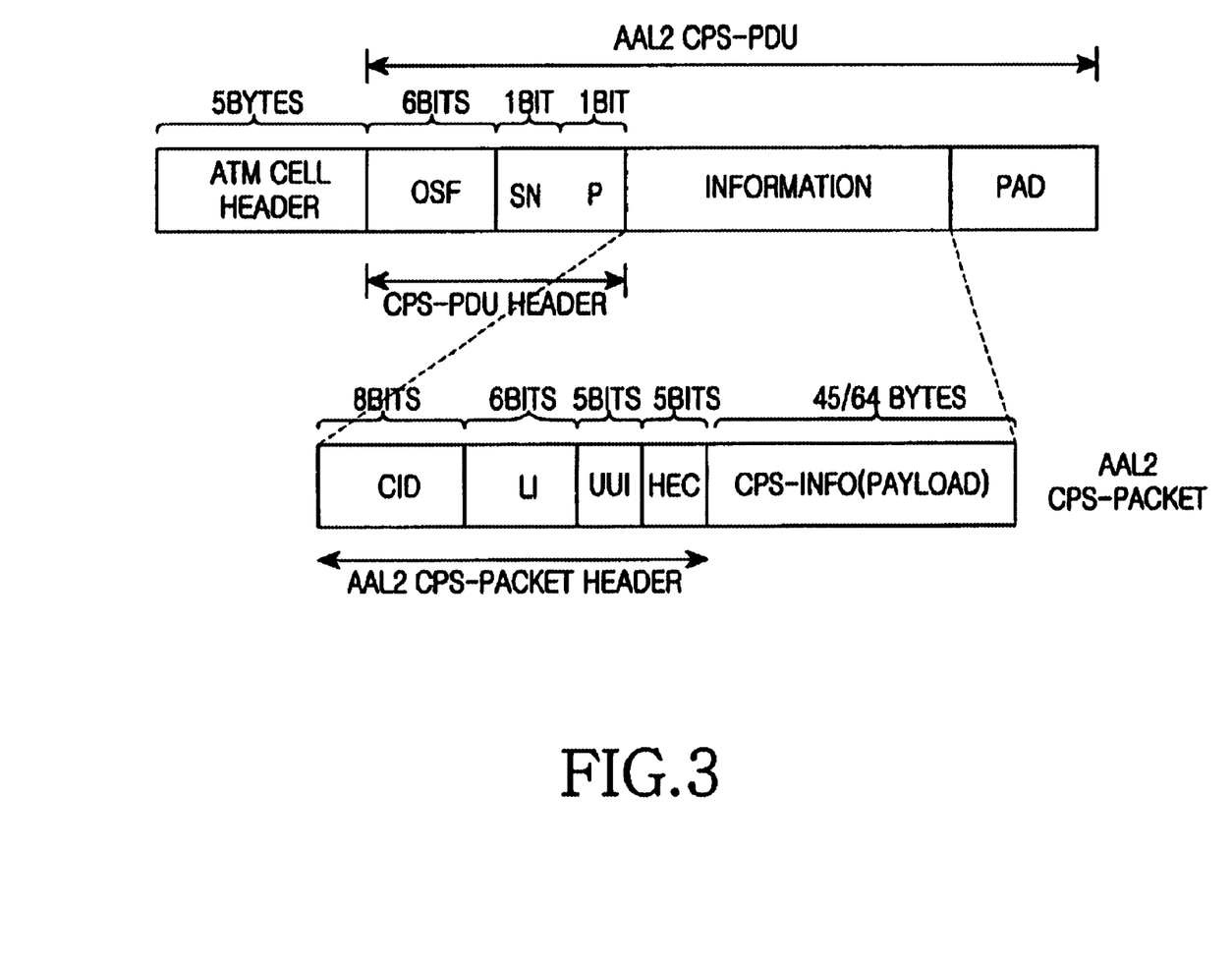
FIG. 3 is a diagram illustrating an AAL2 CPS-PDU format which is applied to the AAL2 interface shown in FIG. 2.

In FIG. 2, the ATM interface 110 performs ATM layer processing for an ATM cell received after physical layer processing, and outputs the processed AAL2 cell having the format shown in FIG. 3 to the AAL2 interface 120. The physical layer function refers to the function of extracting a bit stream from the light beam or electric waveform transmitted from a transmission medium (e.g., optical fiber or coaxial cable), detecting valid samples therefrom, and outputting an ATM cell. The ATM layer function refers to the function of multiplexing/demultiplexing an ATM cell, performing cell routing (including virtual path (VP) routing and virtual channel (VC) routing), creating/deleting a cell header, identifying/extracting a prioritized/non-prioritized cell, controlling a generic flow, processing a signaling VC, and performing an OAM (Operation, Administration and Maintenance) function. Since the physical layer function and the ATM layer function are well known to those skilled in the art and are not directly related to operation of the present invention, a detailed description of the functions will be avoided herein. However, herein, the description of ATM layer processing will be limited to the operation by which the ATM interface 110 performs cell routing and demultiplexing of received ATM cells according to ATM virtual circuit and virtual path connections depending on the ATM cell header, and outputs the resulting AAL2 cell. During cell routing, the ATM interface 110 is controlled by the ATM controller 400. The ATM controller 400 is connected to the ATM interface 110, the IATM formatter 130 in the receiver 100, the ATM interface 320, and the IATM deformatter 310, in the transmitter 300, via the first control bus (CONTROL BUS #1), to provide them with VPI/NCI information for cell routing, thereby performing VPI/VCI conversion.

The AAL2 interface 120 is comprised of the AAL2 synchronizer 122, the CID changer 124, the AAL2 switch 126, and the AAL2 formatter 128. The AAL2 synchronizer 122 receives the AAL2 cell processed by the ATM interface 110. The AAL2 cell input to the AAL2 synchronizer 122 is an ATM cell of FIG. 3, from which an ATM cell header is deleted, i.e., the AAL2 CPS-PDU (Common Part convergence Sublayer-Protocol Data Unit). The payload of these input cells are AAL2 SAR-PDUs (Segmentation And Reassembly-PDU) and each AAL2 SAR-PDU contains one or more AAL2-Packets. These AAL2-Packets are synchronized in the AAL2 synchronizer. A user information field INFORMATION of the AAL2 cell includes at least one AAL2 packet header (i.e., AAL2 CPS-packet header) and a payload CPS-INFO. The user information field can include one or more AAL2 packet headers and their associated payloads. For example, in the user information field of the AAL2 cell, real-time voice data and other data having a short length can be multiplexed as a plurality of packets. The AAL2 synchronizer 122 performs an AAL2 synchronizing function of detecting the starting points of one or more AAL2 packets multiplexed in each AAL2 cell of the ATM virtual circuits. By this AAL2 synchronizing function, the following CID changing operation and AAL2 switching operation can be performed on a packet unit basis for every ATM virtual circuit. The AAL2 synchronizing function is practicable by using an offset field OSF included in the AAL2 CPS-PDU header and a length indicator LI included in the AAL2 packet header. The starting point of the first AAL2 packet is detected by using the OSF, and each starting point of succeeding AAL2 packets can be detected by using the LI, since it is possible to calculate the length of the AAL2 packet depending on the LI included in the previous AAL2 packet header (the AAL2 SAR-PDU header).

FIG. 3 shows the AAL2 CPS-PDU format defined by ITU-T Recommendation I.363.2(D).

Referring to FIG. 3, the AAL2 CPS-PDU (i.e., AAL2 cell) is comprised of a 1-byte (8-bit) CPS-PDU header, user information, and a pad. The CPS-PDU header (hereinafter, referred to as an AAL2 cell header) is comprised of a 6-bit OSF, a 1-bit SN (Sequence Number) field, and a 1-bit P (Parity) field. The OSF (Offset Field), information about the starting point of the AAL2 CPS-packet payload CPS-INFO, indicates an interval between the OSF and the CPS-packet payload. The SN indicates a sequence number of the CPS-PDU, and is determined on a modulo-2 basis. The P indicates parity, and odd parity is preferably used.

The user information is comprised of a 24-bit (3-byte) AAL2 CPS-packet header (hereinafter, referred to as an AAL2 packet header) and a 45/64-byte payload CPS-INFO. The AAL2 packet header is comprised of a 8-bit CID, a 6-bit LI, a 5-bit UUI (User-to-User Information), and 5-bit HEC (Header Error Control). Here, the CID (Channel Identification) field is a field to which a unique number for identifying the AAL2 packet (channel) is assigned. The CID is assigned by a CID assigning part which will be described later, and is used until the AAL2 channel is released. The LI (Length Indicator) indicates the length of the CPS-packet payload, and can indicate a length of up to 45 or 64 bytes in maximum, since the CPS-packet payload can include information of 45 or 64 bytes in maximum. The UUI is used for communication between CPS users. The HEC is used for detecting errors generated in the CPS-packet header. The CPS-packet payload CPS-INFO is a field for carrying the real-time information having a short length such as voice data, and can carry a plurality of packets by multiplexing. Here, CPS-INFO can carry packets having a length of 45 or 64 bytes in maximum. Although FIG. 3 shows that the user information field includes one AAL2 packet for simplicity, the user information field can include a plurality of AAL2 packets.

The AAL2 CPS-PDU format shown in FIG. 3 is an AAL2 cell format which is applied to the AAL2 synchronizer 122 in the AAL2 interface 120 after a received ATM cell undergoes physical layer processing and ATM layer processing by the ATM interface 110. The AAL2 cell is applied to the CID changer 124 after synchronization processing by the AAL2 synchronizer 122. The CID changer 124 is required for the following reason. A CID value, which is a unique number for each AAL2 packet, is assigned by the CID assigning part according to ATM virtual circuits VCs, to be used independently of other virtual circuits. The CID is used to identify the channels being multiplexed within a single VC. However, a collision can happen between such assigned CIDs after switching operation by the AAL2 switch 126, because the AAL2 switch is working with mapping more than one virtual circuit VC to another to identify AAL2 channels. Therefore, the CID changing function is required in order to prevent the collision. More specifically, when AAL2 packets transmitted through different ATM virtual circuits VCs are AAL2-switched and then transmitted to the same single ATM virtual circuit, their CID values might be identical to each other. Since there is no way to identify the AAL2 packet when there are a plurality of identical CID values on a single ATM virtual circuit VC, it is necessary to change the CID values of the AAL2 packets, which are be output to the same ATM virtual circuit VC at the same time, so as to be unique to each other. Here, the term "ATM virtual circuit" is used, but the principles can apply to any ATM connections, including virtual paths VPs as well as virtual channels, over which the ATM cell is transferred. In the following description, the ATM connection will be limited to only the virtual circuit VC, for convenience of explanation.

Figure 5A:
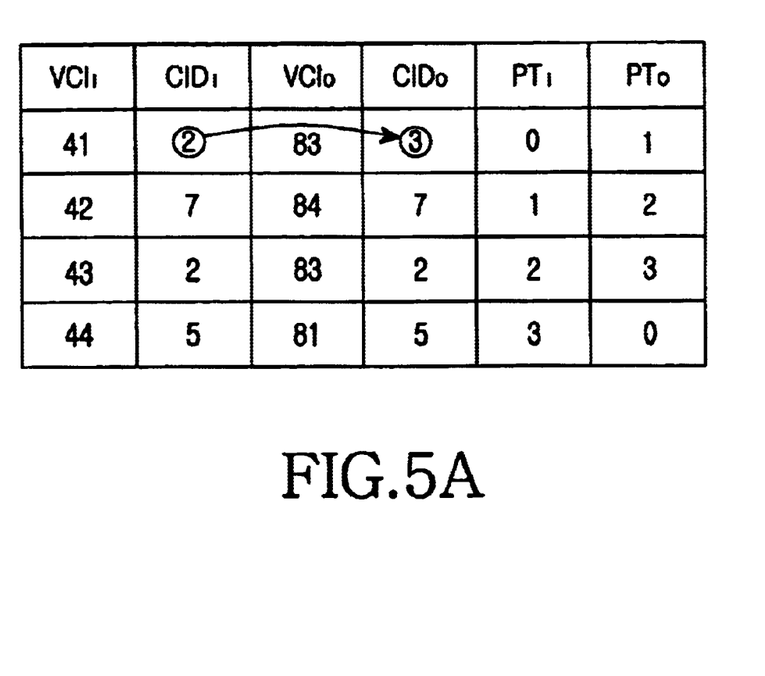
FIGS. 5A and 5B are diagrams illustrating routing tables for operation according to an embodiment of the present invention.
Figure 5B:
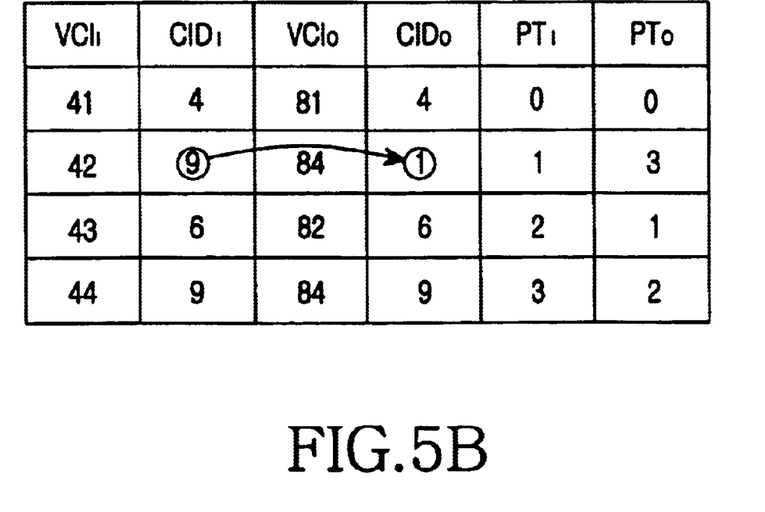

The look-up memory 123 stores cell routing (VCI) information, CID routing information, and routing tag (PT) information for ATM switching, as shown in FIGS. 5A and 5B. The above routing-related information is provided by the ATM controller 400 after performing a signaling procedure with the other party during call setup. The AAL2 controller 410 is provided with such routing-related information from the ATM controller 400 through inter-processor (IPC) communication and stores the provided information in the look-up memory 123. The look-up table 123 can also store information for an AAL2 packet copy function.

The CID changer 124 is connected to the AAL2 controller 410 via a second control bus (CONTROL BUS #2). The CID changer 124 judges from the CID values stored in the look-up memory 123 whether it is necessary to change the CID values for the AAL2 packets, and when necessary, changes the CID values of the AAL2 packet. That is, the CID changer 124 changes the CID values of the AAL2 packets such that the CID values of the AAL2 packets are not identical to each other, when the AAL2 packets to be output to the same VC at the same time are assigned the identical CID during establishment of the AAL2 channel. For example, when the AAL2 packets of first and second VCs are input with the same CID and they are to be output on a certain single VC, the CID for the AAL2 packet of the first VC can be changed to a new CID which is not used by the AAL2 packets of the other VC. Instead of changing the CID for the AAL2 packet of the first VC, it is also possible to have a method of changing the CID for the AAL2 packet of the second VC. The CID changed at this point is used until the AAL2 channel is released.

Figure 4:
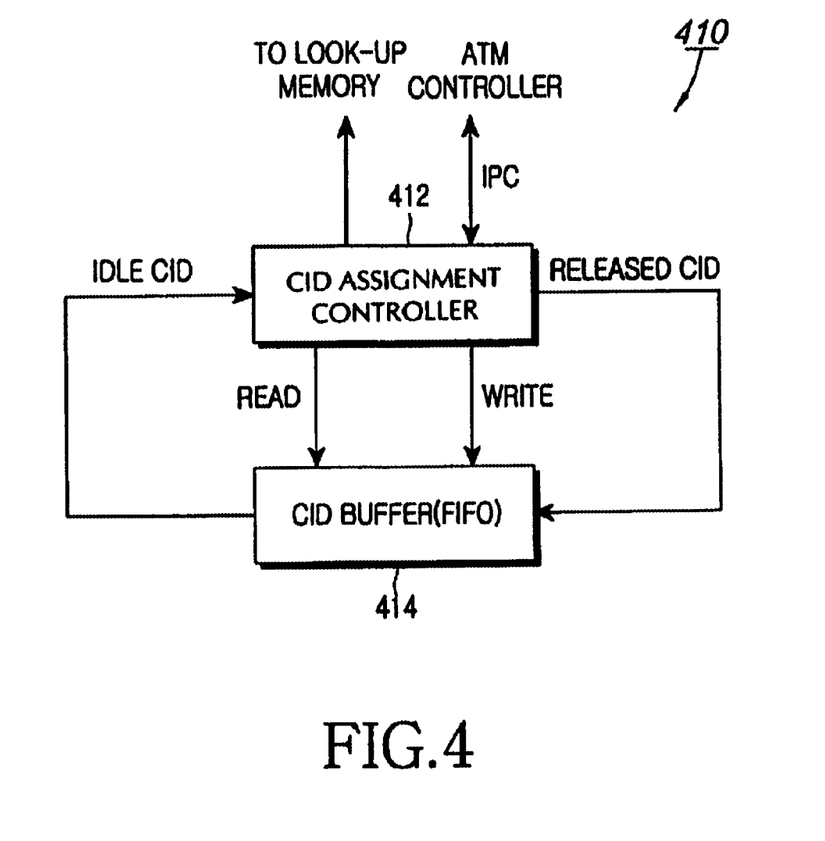
FIG. 4 is a block diagram illustrating the AAL2 controller of FIG. 2 having a CID assignment function according to an embodiment of the present invention.

The AAL2 controller 410 has the function of assigning the CID for identifying each AAL2 packet, and has the structure shown in FIG. 4.

Referring to FIG. 4, the AAL2 controller 410 includes a CID assignment controller 412 and a CID buffer 414, and assigns the CID for each AAL2 packet through AAL2 signaling with the other party. The CID buffer 414 stores a plurality of idle CIDs. Upon receipt of an AAL2 channel (packet) establishment request, the CID assignment controller 412 generates a read signal READ and reads a CID stored in the front end of the CID buffer 414 to assign the read CID as the CID for the AAL2 packet. While assigning the CIDs to the AAL2 packets, the CID assignment controller 412 generates a write signal WRITE to write the CID for the released AAL2 packet in the rear end of the CID buffer 414. That is, the CID buffer 414 stores the idle CIDs for assignment, and upon receipt of an AAL2 packet establishment request, the CID assignment controller 412 reads a CID stored in the CID buffer 414 on a FIFO (First-in First-Out) basis to assign the read CID, and then writes the released CID in the CID buffer 414 on the FIFO basis.

The AAL2 switch 126 connected to the AAL2 controller via the second control bus, performs a switching function on an AAL2 packet unit basis. Further, the AAL2 switch 126 can perform a copy function on an AAL2 packet unit basis. Here, the copy function refers to simultaneously outputting a specific AAL2 packet to several ATM VCs. For this copy function, it is necessary to separately identify a CID indicating a packet to be copied. Since information about the CID to be used for the packet to be copied can also be stored in the look-up memory 123, the AAL2 switch 126 determines a CID to be used for the packet to be copied by using the information stored in the look-up memory 123 and performs the copy function for the AAL2 packet indicated by the determined CID.

The AAL2 formatter 128 assembles the AAL2 packets to be multiplexed to the same ATM VC out of the AAL2 packets switched by the AAL2 switch 126, to generate an AAL2 CPS-PDU (i.e., AAL2 cell). That is, the AAL2 formatter 128 multiplexes the AAL2 packets, generates an AAL2 cell having the same format as the AAL2 cell received from the AAL2 synchronizer 122, and outputs the generated AAL2 cell to the IATM formatter 130.

The IATM formatter 130 connected to the ATM controller 400 via the first control bus, converts the AAL2 cell, to which a plurality of AAL2 packets are multiplexed, into an internal ATM cell used in the system. Here, the operation of generating the internal ATM cell refers to an operation of adding, at the head of the internal ATM cell, a routing tag and an ATM cell header for enabling succeeding ATM switching. Information about the routing tag and the ATM cell header is provided from the ATM controller 400.

The ATM switch 200 switches the internal ATM cell generated by the IATM formatter 130. A general ATM switch can be used for the ATM switch 200.

The ATM controller 400 performs a function of assigning a VPI/VCI (Virtual Path Identifier/Virtual Channel Identifier) value, i.e., performs a cell routing control operation. For performing the VPI/VCI value assigning function, the ATM controller 400 is provided with cell routing (VPI/

VCI) information through signaling with the other party during call setup and controls the ATM interfaces 110 and 320, the IATM formatter 130 and the IATM deformatter 310 depending on the cell routing information. In addition, the ATM controller 400 also controls the ATM cell copy function and the AAL2 packet copy function. For performing the ATM cell copy function, the ATM controller 400 provides routing tag information and ATM cell header information required for cell copy and the ATM switch 200 then performs a switching operation based on this information. In order to perform the ATM cell copy function, the ATM controller 400 can also directly control the ATM switch 200. In order to perform the AAL2 packet copy function, the AAL2 controller 410, which is controlled by the ATM controller 400, controls the AAL2 switch 126.

In the meantime, the ATM controller 400 and the AAL2 controller 410 can know the correlation between the AAL2 packet and the ATM VC through IPC.

Referring back to FIG. 2, the transmitter 300 includes the IATM deformatter 310 and the ATM interface 320. The IATM deformatter 310 and the ATM interface 320 are elements corresponding to the IATM formatter 130 and the ATM interface 110 in the receiver 100, respectively, and perform the reverse operations. That is, the IATM deformatter 310 receives an internal ATM cell switched by the ATM switch 200, converts the received internal ATM cell, and generates an ATM cell format. The ATM interface 320 performs ATM layer processing for the ATM cell generated by the IATM deformatter 310.

The novel device having the structure of FIG. 2 performs the AAL2 processing function as described above. A description will be now made regarding an AAL2 processing operation performed by the device according to the present invention. FIGS. 5A to 11B are diagrams for explaining the AAL2 processing operation and its associated ATM switching operation according to an embodiment of the present invention.

FIGS. 5A and 5B show the structure of the routing tables for performing an operation according to an embodiment of the present invention. Such routing tables can be implemented in the look-up memory 123 of FIG. 2.

More specifically, FIG. 5A shows a routing table according to the time for processing a current mini-cell (i.e., AAL2 packet), and FIG. 5B shows a routing table according to the time for processing a next mini-cell. In the routing tables, $VCI_I$ and $VCI_O$, which indicate input and output virtual channel identifiers, respectively, are provided from the ATM controller 400 to the AAL2 controller 410 through IPC, and then provided to the AAL2 switch 126 via the second control bus. $CID_I$ and $CID_O$, which indicate AAL2 input and output packet numbers, respectively, are provided from the AAL2 controller 410 to the CID changer 124 in order to identify AAL2 channels. $PT_I$ and $PT_O$, which indicate ATM cell input and output ports, respectively, of the ATM switch 200, are provided to the IATM formatter 130 under the control of the ATM controller 400.

Figure 6:
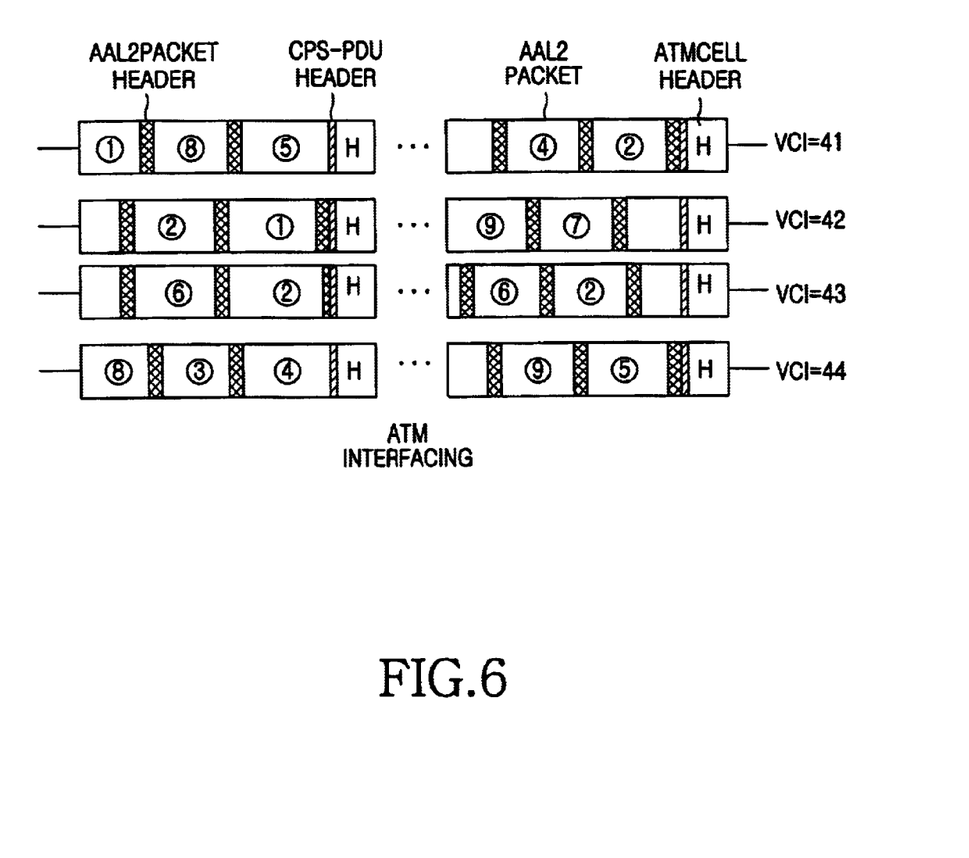
FIG. 6 is a diagram illustrating AAL2 packets processed by the ATM interface of FIG. 2 according to an embodiment of the present invention.

Now, say that an ATM cell has been input to the receiver 100, then the ATM interface 110 performs ATM layer processing for the input ATM cell and outputs the processed resulting ATM cell. As shown in FIG. 6, this ATM cell includes a AAL2 CPS-PDU in which a plurality of AAL2 packets are multiplexed. In FIG. 6, "H" denotes the ATM cell header shown in FIG. 3, hatched blocks denote the CPS-PDU headers, latticed blocks denote the AAL2 packet headers, and circled numerals 1 to 8 denote CIDs of the AAL2 packets. For convenience of explanation, FIG. 6 shows that the CIDs of the AAL2 packets have already been assigned. However, it should be noted that the CID is assigned on a packet unit basis when an AAL2 packet establishment request occurs, and is used until the packet is released.

The AAL2 synchronizer 122 in the AAL2 interface 120 receives the AAL2 cell (AAL2 CPS-PDU) in the format of FIG. 6 from the ATM interface 110. At this point, the AAL2 packets included in the AAL2 cells of different ATM VCs have not been synchronized with each other. Therefore, the AAL2 synchronizer 122 identifies the AAL2 packet and synchronizes the AAL2 packets of the different ATM VCs with each other. Next, the CID changer 124 receives the cells, synchronized according to the different ATM VCs and changes the CID on the packet unit basis, when necessary. At this point, the CID changer 124 is provided with a new CID value changed from the original CID value during packet establishment from the AAL2 controller 410 having the CID assignment function, and this CID value is stored in the look-up memory 123 and maintained until the channel is released.

Figure 7:
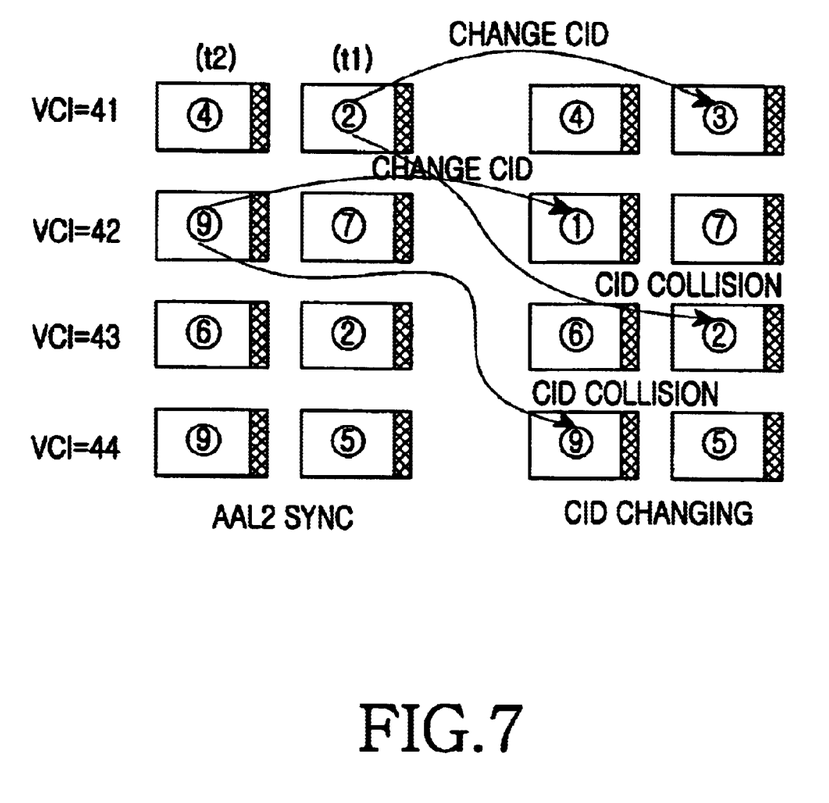
FIG. 7 is a diagram illustrating AAL2 packets processed by the AAL2 synchronizer and the CID changer of FIG. 2 according to an embodiment of the present invention.

Referring to FIG. 7, at the current time t1, the CID of VCI=41 AAL2 packet and the CID of VCI=43 AAL2 packet are both '2', and at the next time t2, the CID of VCI=42 AAL2 packet and the CID of VCI=44 AAL2 packet are both '9'. This, of itself, is not a problem. However, both the '2' VCI=41 AAL2 packet and the '2' VCI=43 AAL2 packet are mapped to the same outgoing VC, $VCI_O$ 83, as shown in FIG. 5A. In the same manner, both the '9' VCI=42 AAL2 packet and the '9' VCI=44 AAL2 packet are mapped to the same outgoing VC, $VCI_O$ 84, as shown in FIG. 5B. Therefore, the CID changer 124 needs to change the CID for the case where the AAL2 packets of the different ATM VCs having the identical CID are multiplexed to the identical VCI, so as to prevent CID collision. For example, the CID changer 124 performs CID changing for the VCI=41 AAL2 packet at the current time t1 and the VCI=42 AAL2 packet at the next time t2. By this CID changing operation, the CID of the VCI=41 AAL2 packet is changed from '2' to '3' at the current time t1, and the CID of the VCI=42 AAL2 packet is changed from '9' to '1' at the next time t2. Therefore, although the VCI=41 AAL2 packet and the VCI=43 AAL2 packet are multiplexed in the same VC at the current time t1 or the VCI=42 AAL2 packet and the VCI=44 AAL2 packet are multiplexed in the same VC at the next time t2 by the following AAL2 switching operation, the CIDs of the multiplexed AAL2 packets do not overlap. These newly changed CID values are provided from the CID assignment part of the AAL2 controller 410.

Figure 8A:
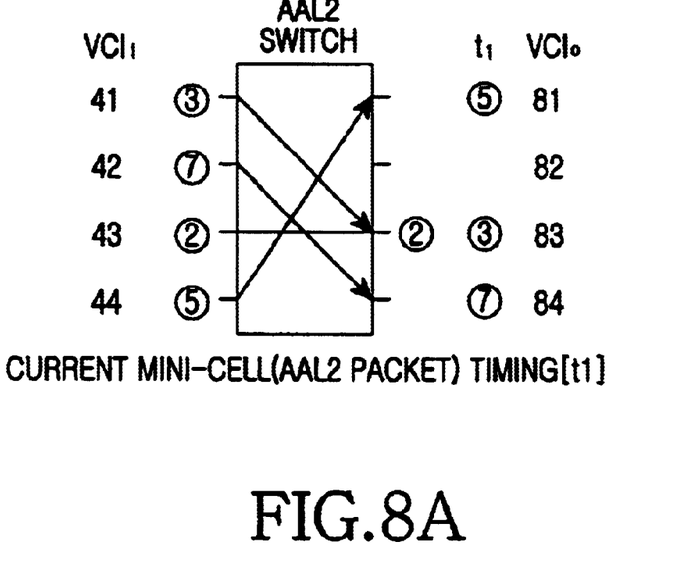
FIGS. 8A and 8B are diagrams illustrating AAL2 packets processed by the AAL2 switch of FIG. 2 according to an embodiment of the present invention.
Figure 8B:
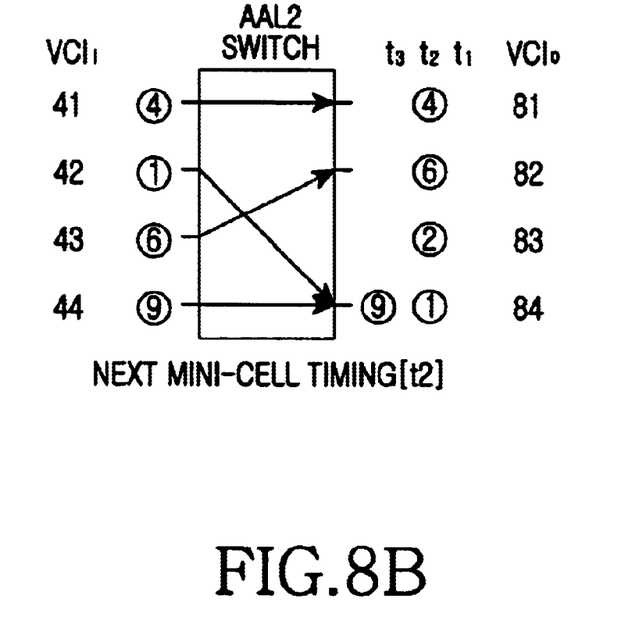

The AAL2 switch 126 performs the switching operation shown in FIGS. 8A and 8B for the AAL2 packets on which the CID changing function has been performed on a packet unit basis. At this point, the AAL2 switch 126 performs the switching operation using the $VCI_I$ and $VCI_O$ values on the routing tables shown in FIGS. 5A and 5B, provided from the ATM controller 400.

Referring to FIG. 8A, at the current mini-cell (AAL2 packet) time t1, the AAL2 switch 126 performs switching such that a $VCI_I$=41 packet '3' is output to $VCI_O$=83, a $VCI_I$=42 packet '7' is output to $VCI_O$=84, a $VCI_I$=43 packet '2' is output to $VCI_O$=83, and a $VCI_I$=44 packet '5' is output to $VCI_O$=81.

Referring to FIG. 8B, at the next mini-cell (AAL2 packet) time t2, the AAL2 switch 126 performs switching such that a $VCI_I$=41 packet '4' is output to $VCI_O$=81, a $VCI_I$=42 packet '1' is output to $VCI_O$=84, a $VCI_I$=43 packet '6' is output to $VCI_O$=82, and a $VCI_I$=44 packet '9' is output to $VCI_O$=84.

Since the packet length is not fixed but variable, the AAL2 switch 126 is difficult to implement in hardware, unlike the ATM switch 200. Instead, it is preferable for the AAL2 switch 126 to be implemented in software as a packet switch.

Figure 9:
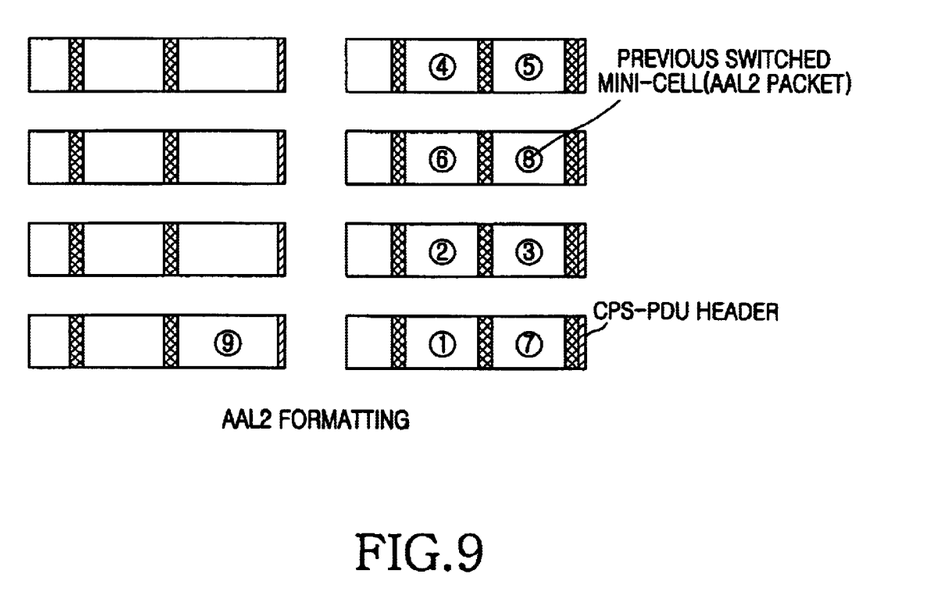
FIG. 9 is a diagram illustrating AAL2 packets processed by the AAL2 formatter of FIG. 2 according to an embodiment of the present invention.

The AAL2 formatter 128 multiplexes the AAL2 packets, which were switched to the same ATM VC by the AAL2 switch 126, to generate a single AAL2 cell (AAL2 CPS-PDU) in the format of FIG. 3. The generated AAL2 cell is shown in FIG. 9, by way of example. Here, the packet '8' is the previously switched AAL2 packet.

Figure 10:
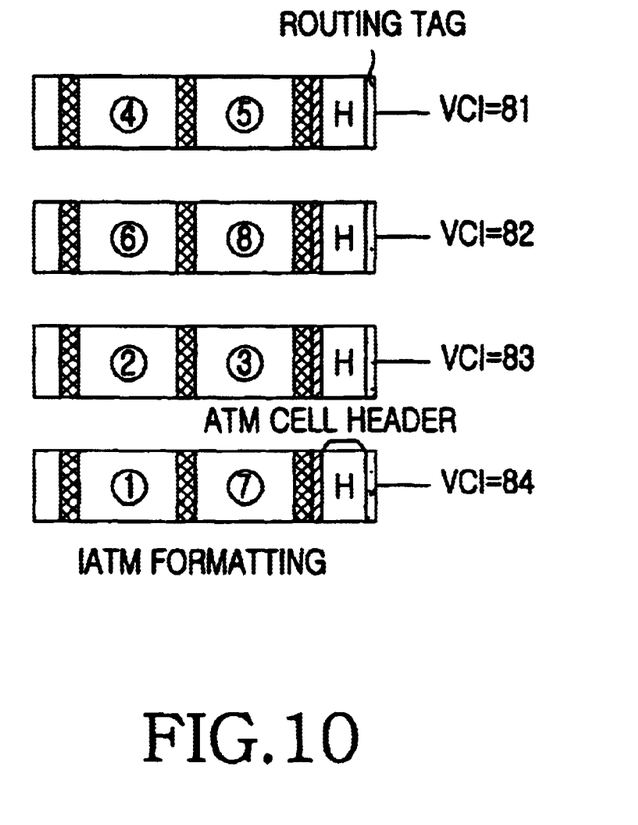
FIG. 10 is a diagram illustrating an internal ATM (IATM) cell processed by the IATM formatter of FIG. 2 according to an embodiment of the present invention.

The IATM formatter 130 converts the AAL2 cell output from the AAL2 formatter 128 to an IATM cell in the format of FIG. 10, which is the proper format to be switched by the ATM switch 200. At this point, the routing tag and ATM cell header are added at the head of each cell.

Figure 11A:
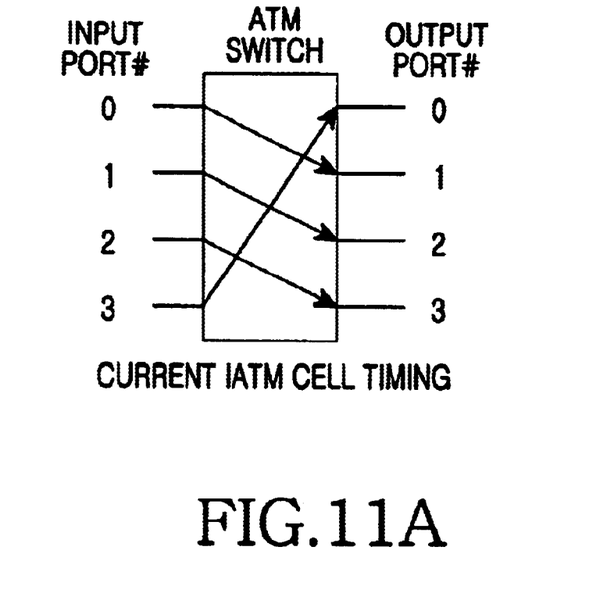
FIGS. 11A and 11B are diagrams illustrating switching of an IATM cell processed by the ATM switch of FIG. 2 according to an embodiment of the present invention.
Figure 11B:
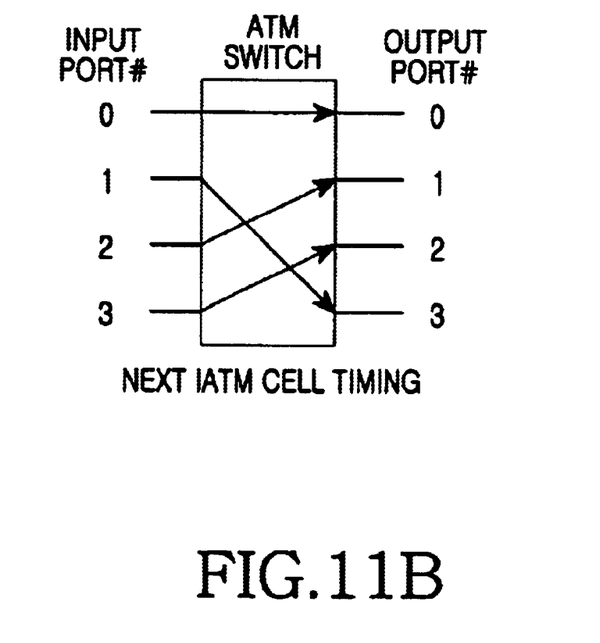

The ATM switch 200 receives the IATM cell generated by the IATM formatter 130 and performs switching as shown in FIGS. 11A and 11B. At this point, the ATM switch 200 performs the switching operation using the routing tag information ($PT_O$ value) on the routing table shown in FIGS. 5A and 5B, provided from the ATM controller 400.

Referring to FIG. 11A, at the current IATM cell time, the ATM switch 200 performs switching such that a cell input at an input port #0 is output to an output port #1, a cell input at an input port #1 is output to an output port #2, a cell input at a port #2 is output to an output port #3, and a cell input at an input port #3 is output to an output port #0.

Referring to FIG. 11B, at the next IATM cell time, the ATM switch 200 performs switching such that a cell input at an input port #0 is output to an output port #0, a cell input at an input port #1 is output to an output port #3, a cell input at an input port #2 is output to an output port #1, and a cell input at an input port #3 is output to an output port #2.

In the meantime, one IATM cell time corresponds to a plurality of AAL2 packet (mini-cell, CPS-packet) times. Since the AAL2 packet size is variable, the number of the AAL2 packet times corresponding to one IATM cell time can be varied. That is, although the IATM cell time is fixed, the mini-cell time is variable depending on the AAL2 packet size.

As described above, this novel ATM network performs AAL2 processing for each AAL2 packet multiplexed in an ATM cell, which was ATM layer processed by the ATM interface, and then provides the processed AAL2 packets to the ATM switch. In this manner, this novel ATM network can prevent the bandwidth loss and the transmission delay which may be caused when transmitting real-time data having a short length such as voice data.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An AAL2 (ATM (Asynchronous Transfer Mode) Adaptation Layer 2) processing device comprising:
   an AAL2 synchronizer for receiving an AAL2 cell in which at least one AAL2 packet is multiplexed, and detecting a start point of each packet to synchronize the packet;
   an AAL2 switch for switching the synchronized packet according to routing information provided during call setup; and
   an AAL2 formatter for multiplexing the switched packet according to ATM connections, and generating an output AAL2 cell having the same format as the input AAL2 cell.

2. The AAL2 processing device as claimed in claim 1, further comprising a CID (Channel Identification) changer interconnected between the AAL2 synchronizer and the AAL2 switch, for determining whether there are packets to be switched to an identical ATM connection at the same time out of the packets to be switched by the AAL2 switch by using the cell routing information, and changing, when there are said packets, the CIDs of the packets such that the CIDs of the packets are not identical to each other.

3. An ATM (Asynchronous Transfer Mode) system having an AAL2 (ATM Adaptation Layer 2) processing function, comprising:
   an ATM interface for performing ATM layer processing on a received ATM cell, in which at least one AAL2 packet is multiplexed, according to first routing information provided during call setup, and outputting the ATM layer processed ATM cell as an input AAL2 cell;
   an AAL2 interface for synchronizing the AAL2 packets included in said input AAL2 cell on a packet unit basis, switching the synchronized AAL2 packets according to second routing information provided during the call setup, and multiplexing the switched AAL2 packets according to ATM connections to generate an output AAL2 cell having the same format as said input AAL2 cell;
   an internal ATM cell formatter for attaching an ATM cell header and a routing tag to said output AAL2 cell and generating a resulting internal ATM cell; and
   an ATM switch for switching said internal ATM cell according to third routing information provided during the call setup.

4. The ATM system as claimed in claim 3, wherein the AAL2 interface comprises:
   an AAL2 synchronizer for synchronizing each AAL2 packet by detecting a start point of each AAL2 packet included in the input AAL2 cell;
   an AAL2 switch for switching the synchronized AAL2 packet according to the second routing information;
   an AAL2 formatter for multiplexing the switched AAL2 packets according to virtual channels, and generating an output AAL2 cell having the same format as the input AAL2 cell; and
   a CID changer interconnected between the AAL2 synchronizer and the AAL2 switch, for determining whether there are packets to be switched to an identical ATM connection at the same time out of the packets to be switched by the AAL2 switch by using the second routing information, and changing, when there are said packets, the CIDs of the packets such that the CIDs of the packets are not identical to each other.

5. An ATM (Asynchronous Transfer Mode) system having an AAL2 (ATM Adaptation Layer 2) processing function, comprising:
   a receiver for performing ATM layer processing and AAL2 processing for a received ATM cell in which at least one AAL2 packet is multiplexed,
   an ATM switch for switching an ATM cell from the receiver and a transmission ATM cell according to third routing information;
   a transmitter for transmitting the transmission ATM cell switched by the ATM switch; and a controller;

the receiver including;

receiving ATM interface for performing ATM processing for the received ATM cell according to first routing information, and outputting the ATM layer processed ATM cell as an input AAL2 cell;

an AAL2 interface for synchronizing the at least one AAL2 packet included in the input AAL2 cell on a packet unit basis, switching the synchronized at least one AAL2 packet according to second routing information provided during the call setup, and multiplexing the switched at least one AAL2 packet according to ATM connections to generate an output AAL2 cell having the same format as the input AAL2 cell; and a cell formatter for attaching an ATM cell header and a routing tag to the output AAL2 cell and generating a resulting internal ATM cell;

the transmitter including;

a cell deformatter for removing the routing tag included in the transmission internal ATM cell having the same format as the internal ATM cell, and generating a resulting ATM cell; and a transmission ATM interface for performing ATM layer processing for the ATM cell from the cell deformatter according to the first routing information, and then outputting the transmission ATM cell;

the controller for providing the first, second and third routing information provided from the other party during call setup to the ATM interfaces, the AAL2 interface and the ATM switch.

6. The ATM system as claimed in claim 5, wherein the AAL2 interface comprises:

an AAL2 synchronizer for synchronizing each at least one AAL2 packet by detecting a start point of each at least one AAL2 packet included in the input AAL2 cell;

an AAL2 switch for switching the synchronized at least one AAL2 packet according to the second routing information;

an AAL2 formatter for multiplexing the switched at least one AAL2 packet according to ATM connections, and generating an output AAL2 cell having the same format as the input AAL2 cell; and a CID changer interconnected between the AAL2 synchronizer and the AAL2 switch, for determining whether there are packets to be switched to an identical ATM connection at the same time out of the packets to be switched by the AAL2 switch by using the second routing information, and changing, when there are said packets, the CIDs of the packets such that the CIDs of the packets are not identical to each other.

7. The ATM system as claimed in claim 6, wherein the controller comprises:

an ATM controller connected to the ATM interfaces, the cell formatter, the cell deformatter and the ATM switch via a first control bus, for providing the first routing information to the ATM interfaces, the cell formatter and the cell deformatter, and providing the third routing information to the ATM switch; and an AAL2 controller connected to the AAL2 interface via a second control bus, for performing inter-processor communication (IPC) with the ATM controller, and providing the second routing information from the ATM controller to the AAL2 interface.

8. A cell processing method in an ATM (Asynchronous Transfer Mode) system having an AAL2 (ATM Adaptation Layer 2) processing function, comprising the steps of:

(a) performing ATM layer processing for a received ATM cell, in which at least one AAL2 packet is multiplexed, according to first routing information provided during call setup, and outputting the ATM layer processed ATM cell as an input AAL2 cell;

(b) synchronizing the at least one AAL2 packet included in the input AAL2 cell on a packet unit basis, switching the synchronized at least one AAL2 packet according to second routing information provided during the call setup, and multiplexing the switched at least one AAL2 packet according to ATM connections to generate an output AAL2 cell having the same format as the input AAL2 cell;

(c) attaching an ATM cell header and a routing tag to the output AAL2 cell and generating a resulting internal ATM cell; and (d) switching the internal ATM cell according to third routing information provided during the call setup.

9. The cell processing method as claimed in claim 8, wherein the step (b) comprises the steps of:

synchronizing each at least one AAL2 packet by detecting a start point of each at least one AAL2 packet included in the input AAL2 cell;

switching the synchronized at least one AAL2 packet according to the second routing information;

multiplexing the switched at least one AAL2 packet according to virtual channels, and generating an output AAL2 cell having the same format as the input AAL2 cell; and determining whether there are packets to be switched to an identical ATM connection at the same time out of the packets to be AAL2 switched by using the second routing information, and changing, when there are said packets, the CIDs of the packets such that the CIDs of the packets are not identical to each other.

10. An AAL2 processing method comprising the steps of:

receiving an AAL2 cell in which at least one AAL2 packet is multiplexed, and detecting a start point of each packet to synchronize the packet;

switching the synchronized packet according to routing information provided during call setup;

multiplexing the switched packet according to ATM connections, and generating an output AAL2 cell having the same format as the input AAL2 cell; and determining whether there are packets to be switched to an identical ATM connection at the same time out of the packets to be AAL2 switched by using the cell routing information, and changing, when there are said packets, the CIDs of the packets such that the CIDs of the packets are not identical to each other.

* * * * *